2,501,248

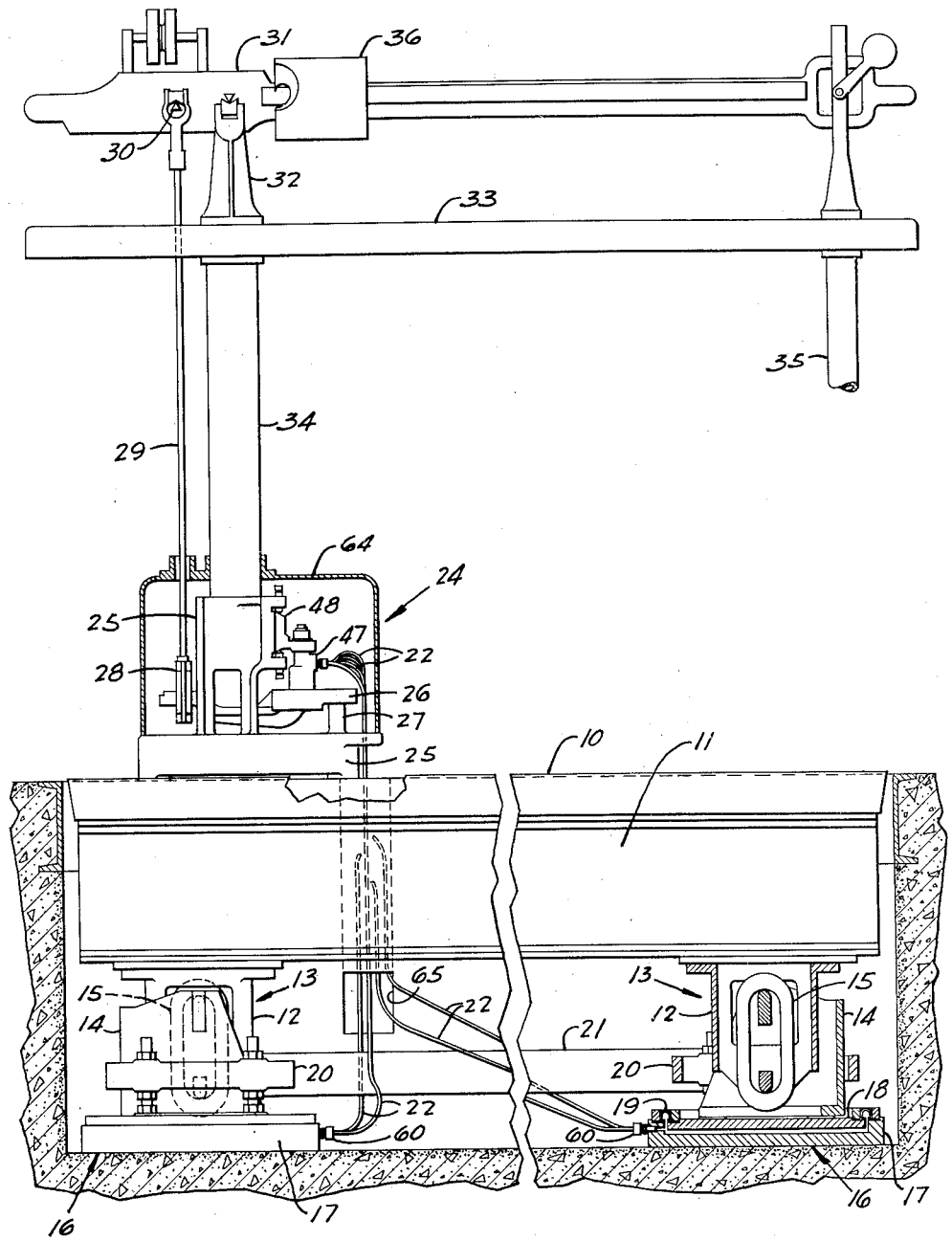

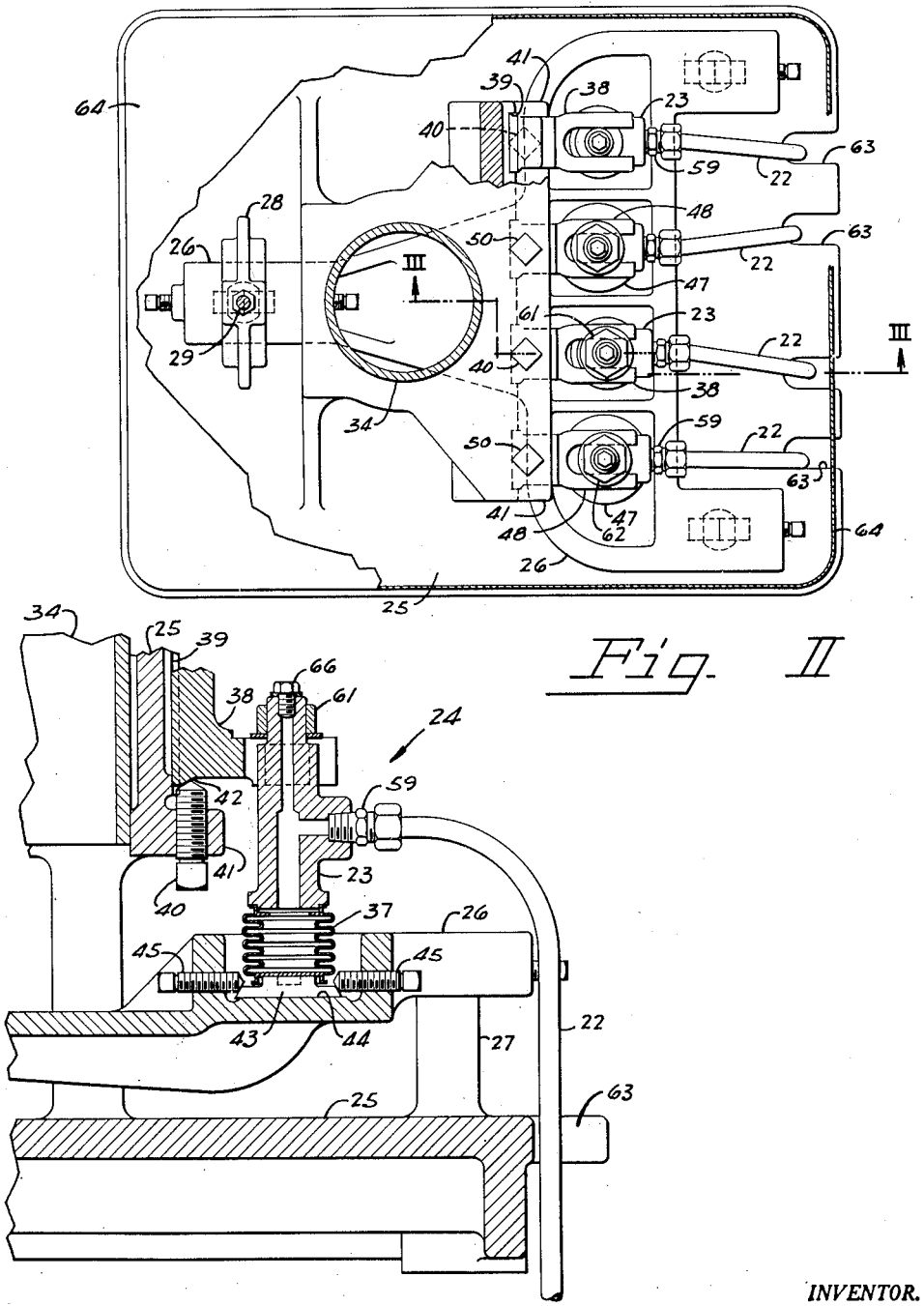
Fig. II
Fig. III
INVENTOR.
Lawrence S. Williams
BY
Marshall and Marshall
ATTORNEYS March 21, 1950     L. S. WILLIAMS     2,501,248
HYDRAULIC WEIGHING SCALE
Filed Feb. 9, 1946     3 Sheets-Sheet 3
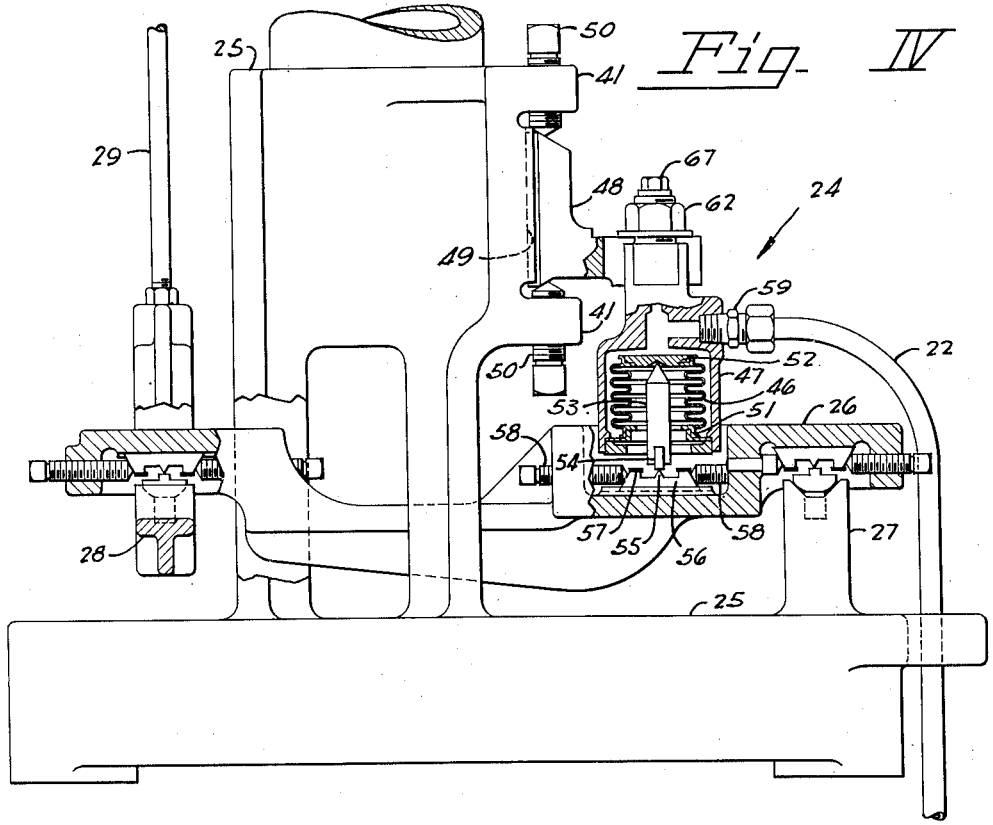
*Fig. IV*
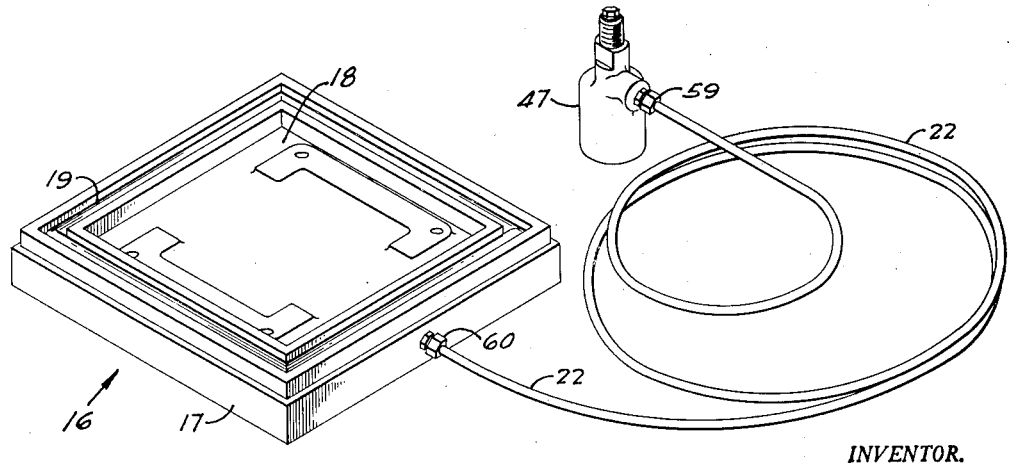
*Fig. V*
INVENTOR.
Lawrence S. Williams
BY
Marshall and Marshall
ATTORNEYS Patented Mar. 21, 1950

UNITED STATES PATENT OFFICE 2,501,248

HYDRAULIC WEIGHING SCALE

Lawrence S. Williams, Toledo, Ohio, assignor to Toledo Scale Company, Toledo, Ohio, a corporation of New Jersey Application February 9, 1946, Serial No. 646,593

1 Claim. (Cl. 265—47)

This invention relates to hydraulic weighing scales and in particular to an improved hydraulic force transmitting apparatus. This application is a continuation-in-part of the application resulting in Patent No. 2,410,139.

One of the difficult problems to be solved in securing high accuracy in a weighing scale employing hydraulic force transmitting elements is to secure a hydraulic fluid which is substantially non-compressible and of getting the fluid into the hydraulic system without entrapping any air in the system or allowing air or other gas to dissolve in the fluid. Under laboratory conditions or in a factory it is possible to evacuate a hydraulic system composed of a capsule, a pipe, and a bellows, and to admit the hydraulic fluid without admitting any air. If the hydraulic fluid has been boiled to drive out any dissolved gas and is immediately drawn into the hydraulic system, the system will operate satisfactorily. This procedure is difficult to carry out when installing a scale and usually some air is left entrapped in the system. The volume occupied by this air varies according to the pressure in the system and the air acts as a spring such that the capsule diaphragms deflect under load. Since the membranes sealing the capsule diaphragm to the capsule base present some mechanical rigidity a decrease in the volume of the hydraulic fluid causes a portion of the load force to be carried by the capsule membranes instead of by the hydraulic fluid with a result that the scale indicates a load less than the actual load on the load receiver.

The air in the system does not behave like a simple spring, but tends to dissolve in the hydraulic fluid when there is a load on the scale and to come out of solution when the load is removed. The time required for the air to go into or come out of solution is relatively great so that the error from this source appears as creep or slow change in indication.

The principal object of this invention is to provide a hydraulic force transmitter whose component elements may be permanently connected, evacuated, and filled with hydraulic fluid at the factory before they are shipped to the user and installed in a scale.

Another object of the invention is to permanently connect a hydraulic weighing scale capsule through a flexible pipe to its associated bellows so that the resulting hydraulic force transmitter may be replaced in service without the use of expensive or cumbersome evacuating and filling equipment.

Other more specific objects and advantages are apparent from the following description in which reference is made to the accompanying drawings.

In the drawings:

Figure I is a front elevation, partly in section, of a hydraulic weighing scale embodying the invention.

Figure II is a plan view with parts broken away of the hydraulic pressure receiving elements and the gathering lever for transmitting force to a load counterbalancing mechanism.

Figure III is a fragmentary vertical section taken substantially along the line III—III of Figure II.

Figure IV is a side elevation with parts shown in section and parts broken away of the hydraulic pressure receiving elements and the gathering lever.

Figure V is a perspective view of the improved hydraulic force transmitter.

These specific figures and the accompanying description are intended merely to illustrate the invention but not to impose limitations on the claim.

A load receiving platform 10 is supported on girders 11 which at their ends are carried on depending brackets 12. The brackets 12 are part of single link suspensions 13 which also include stands 14 and connecting links 15. The stands 14 are supported on hydraulic capsules 16, each of which has a base member 17 whose upper surface has a shallow fluid containing recess in which a load supporting diaphragm 18 is fitted and hydraulically supported. The fluid is retained by a flexible membrane 19 which seals the space between the base member 17 and the load supporting diaphragm 18. Stabilizing rings 20 secured to the stands 14 or to the load supporting diaphragms 18 are inter-connected by an H-shaped pipe framework 21 to prevent any tipping of the load supporting diaphragms 18 in the capsules 16. The space between the base members 17 and the diaphragms 18 of the capsules 16 containing the hydraulic fluid communicates through flexible tubes 22 with bellows supporting members or connectors 23 of a pressure receiving system 24. The force created by the hydraulic pressure in the pressure receiving system 24 acts between a base 25 and a gathering lever 26 which is pivotally supported on fulcrum stands 27 erected from a flat lower portion of the base 25. From the lever 26 force is transmitted through a stirrup 28 and a steelyard rod 29 to a load pivot 30 of a weigh beam 31. The weigh beam 31 is pivotally supported on a fulcrum stand 32 erected on a weigh beam shelf 33 which in turn is supported on columns 34 and 35. A poise 36 slidably mounted on the weigh beam 31 is adapted to counterbalance the loads applied to the load receiving platform 10.

A bellows 37 attached to the connector 23 may be internally stressed by applying the hydraulic pressure created in the capsules 16 to its interior as is indicated in Figure III. The upper mounting for the bellows 37 comprises the connector 23 which is adapted to mechanically support the bellows and hydraulically connect it to one of the flexible tubes 22 leading to one of the capsules 16. The connector 23 is adjusted and locked between arms of a bracket 38 which in turn is vertically adjustable in ways 39 of the base 25. Adjusting screws 40 threaded through horizontal flanges 41 at the ends of the ways 39 engage sloped faces 42 of the bracket 38 to provide for its vertical adjustment and locking.

The lower end of the bellows 37 is attached to a force transmitting block 43 resting in horizontal ways 44 of the lever 26. The force transmitting block 43 is adjusted in the lever 26 to correct the force transmission ratio and is held in position by locking screws 45 threaded through vertical flanges in the lever 26 at the ends of the ways 44. The hydraulic scale of Figure I incorporates two such internally stressed bellows 37 connected to capsules located under diagonally opposite corners of the load receiving platform 10.

Bellows may also be externally stressed by applying the hydraulic pressure to the outside of a bellows enclosed in a surrounding cup-shaped housing. In this arrangement a bellows 46 (Figure IV) is located in a cup-shaped housing 47 supported by a bracket 48 which is mounted in ways 49 lying parallel to the ways 39 in the base 25. The bracket 48 is positioned and locked by adjusting screws 50 threaded through the flanges 41. An annularly shaped base 51 is firmly sealed to the lower end of the bellows 46 and is threaded into the bottom, i.e. the normally open end, of the cup-shaped housing 47. The upper end of the bellows 46 is sealed by a cap 52. The space between the bellows 46 and the cup-shaped housing 47 is filled with hydraulic fluid and is connected by means of one of the flexible tubes 22 to one of the capsules 16. The hydraulic pressure from the capsules thus applied externally tends to collapse the bellows 46 and thereby exerts force through a strut 53 whose pointed upper end rests in a cone-shaped depression in the underside of the cap 52. The lower end of the strut 53 is fitted with a bearing 54 which rests on a knife edge 55 of a knife edge block 56 carried in the lever 26 similarly to the force transmitting block 43. The bearing 54 is maintained in position on the knife edge 55 by an annular flexure plate 57 which surrounds the knife edge 55 and is welded or otherwise secured to the ends of the bearing surface of the bearing 54 and to points on the knife edge block 56 remote from the knife edge 55. The knife edge block 56 is adjusted and locked in position by adjusting screws 58 threaded through flanges in the lever 26. Two of these externally stressed bellows are used in the hydraulic scale illustrated in Figure I.

Because of the difficulty of evacuating and filling the hydraulic force transmitters consisting of the capsules 16, the pipes 22, and the bellows 37 or 46 without entrapping air in the system makes it necessary as a practical matter that these elements be permanently connected and properly filled under carefully controlled factory conditions. The bellows 37 is permanently attached to the connector 23 and to the force transmitting block 43, while the force transmitting block is removably mounted in the lever 26. The upper end of the connector 23 is removably mounted between bifurcated arms of the bracket 38. The connector 23 is also permanently connected to one of the pipes 22 which lead to the load supporting capsules 16. While threaded connections 59 are shown as a convenient method of making the attachment, they are considered to be permanent because they are not intended to be opened during the useful life of the device. Similar connections 60 are used to permanently connect the flexible tubes 22 to the bases 17 of the capsules 16. The tubes 22 are made of a flexible material so that they may be coiled as shown in Figure V to facilitate storage and shipping. Those tubes 22 which lead to the cup-shaped bellows housings 47 are also permanently connected thereto. These bellows housings and bellows may be removed from the pressure receiving assembly 24 because the upper conical point of the stud 53 merely rests against and is guided in a corresponding conical depression in the lower surface of the upper bellows cap 52.

The connectors 23 or the bellows housings 47 may be removed from the frame 25 of the pressure receiving assembly either by loosening nuts 61 or 62 threaded onto the upper ends of the connectors 23 or housings 47 respectively so that the connector or housing may be slipped out from between the arms of the brackets 38 or 48. In the event that it should be undesirable to disturb the adjustment of the connector 23 or the bellows housing 47 the brackets 38 or 48 may be removed by merely loosening the upper ones of the clamping screws 40 or 50. The base 25 along its edge parallel to the fulcrum axis of the lever 26 has notches 63 to receive the flexible tubes 22 so that a cover 64 enclosing the pressure receiving system 24 may fit smoothly down onto the base 25.

In the construction of the pit for receiving the load receiver 10 and the load receiver supports including the capsules 16, a passage 65 connecting the pit to the vicinity of the force counterbalancing and indicating mechanism, is made of sufficient cross sectional area and configuration so that the various bellows assemblies my be passed therethrough when the scale is being installed.

When the hydraulic force transmitters are assembled at the factory, screws 66 and 67 (Figures III and IV) screwed into the top end of passage ways leading through the upper portions of the connector 23 or the bellows housing 47 are removed and the members are attached to a vacuum system which extracts substantially all of the air from the capsule, pipe, and the connectors. (The bellows housing 47 may also be considered as a connector.)

After the air has been extracted hydraulic fluid which has been boiled to deaerate it is admitted through a T-connection in the vacuum line and the passages in the connectors. After the system is filled the connection is removed and the screws 66 and 67 are put in place to seal the system. This process of filling insures that the hydraulic force transmitters are completely filled with fluid and that there is no air either in the system or dissolved in the fluid to interfere with the accurate transmission of force from the capsules to the pressure receiving systems and load counterbalancing mechanisms. By permanently connecting the capsule and its associated bellows by means of a flexible tube and permanently attached connector, all the inconveniences and inaccuracies of attempting to fill hydraulic systems after they have been installed in a scale are eliminated.

Various modifications of the invention may be devised as required for the particular use to which the hydraulic force transmitter is applied. These modifications may be made without departing from the scope of the invention.

Having described my invention, I claim:

In a hydraulic weighing scale, a pressure transmitting and receiving system comprising, in combination, a load supporting capsule, a pressure receiver, a flexible pipe hydraulically connecting the capsule and the pressure receiver, a pressure receiver base, a lever mounted on the base, said base having at least one notch in its periphery to receive the flexible pipe, an open end bifurcated bracket for supporting the pressure receiver in operative relation to the lever, means for pivotally connecting the pressure receiver to the lever, and a cover for the base, said cover fitting the periphery of the base to fully enclose the pressure receiving mechanism, said notched base periphery and said bifurcated bracket permitting replacement of the pressure receiver and capsule assembly without breaking the hydraulic connection between the capsule and the pressure receiver.

LAWRENCE S. WILLIAMS.

REFERENCES CITED

The following references are of record in the file of this patent:

UNITED STATES PATENTS

| Number | Name | Date |
| --- | --- | --- |
| 1,533,281 | Tautz | Apr. 14, 1925 |
| 2,279,912 | Bohannan | Apr. 14, 1942 |
| 2,294,770 | Bohannan | Sept. 1, 1942 |
| 2,410,139 | Williams | Oct. 29, 1946 |